United States Patent
Zhu

(10) Patent No.: US 11,577,644 B2
(45) Date of Patent: Feb. 14, 2023

(54) L3-LEVEL AUTO-EMERGENCY LIGHT SYSTEM FOR EGO VEHICLE HARSH BRAKE

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 323 days.

(21) Appl. No.: 16/905,036

(22) Filed: Jun. 18, 2020

(65) Prior Publication Data

US 2021/0394672 A1    Dec. 23, 2021

(51) Int. Cl.
*B60Q 1/52* (2006.01)
*G05D 1/00* (2006.01)
*B60W 50/00* (2006.01)
*B60Q 1/50* (2006.01)

(52) U.S. Cl.
CPC .......... *B60Q 1/525* (2013.01); *B60W 50/0098* (2013.01); *G05D 1/0088* (2013.01); *B60W 2050/0075* (2013.01); *B60W 2520/105* (2013.01); *B60W 2556/10* (2020.02); *G05D 2201/0213* (2013.01)

(58) Field of Classification Search
CPC ............ B60Q 1/525; B60Q 1/44; B60Q 1/52; B60W 50/0098; B60W 2050/0075; B60W 2520/105; B60W 2556/10; G05D 1/0088; G05D 2201/0213
See application file for complete search history.

(56) References Cited

FOREIGN PATENT DOCUMENTS

| KR | 970005890 A | * | 2/1997 |
| KR | 19980014502 A | * | 5/1998 |
| KR | 200218235 Y1 | * | 3/2001 |
| KR | 100757505 B1 | * | 9/2006 |
| KR | 2008106814 A | * | 12/2008 |

* cited by examiner

*Primary Examiner* — Rodney A Butler
(74) *Attorney, Agent, or Firm* — Womble Bond Dickinson (US) LLP

(57) ABSTRACT

In one embodiment, a method, apparatus, and system for automatically switching on an emergency light at an autonomous driving vehicle (ADV) is disclosed. A present speed of an ADV at a first time instant is determined. A present deceleration of the ADV at the first time instant is determined. Whether the present speed satisfies a present speed condition and whether the present deceleration satisfies a present deceleration condition at the first time instant are determined. In response to determining that the present speed satisfies the present speed condition and that the present deceleration satisfies the present deceleration condition, whether a recent deceleration history of the ADV satisfies a recent deceleration history condition and whether an expected deceleration of the ADV satisfies an expected deceleration condition are determined. If either condition is satisfied, an emergency light of the ADV is automatically switched on.

20 Claims, 6 Drawing Sheets

L3-LEVEL AUTO-EMERGENCY LIGHT SYSTEM FOR EGO VEHICLE HARSH BRAKE

TECHNICAL FIELD

Embodiments of the present disclosure relate generally to operating autonomous driving vehicles. More particularly, embodiments of the disclosure relate to automatically controlling an emergency light at an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Different levels (L0 to L5) of autonomous driving have been defined. At level 3, drivers are still necessary in level 3 cars, but are able to completely shift "safety-critical functions" to the vehicle, under certain traffic or environmental conditions. It means that the driver is still present and will intervene if necessary, but is not required to monitor the situation in the same way it does for the previous levels.

When a harsh brake is applied at an autonomous driving vehicle, an emergency light at the ADV should be switched on to warn the following vehicles. However, this is not necessarily done automatically, particularly at level 3.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
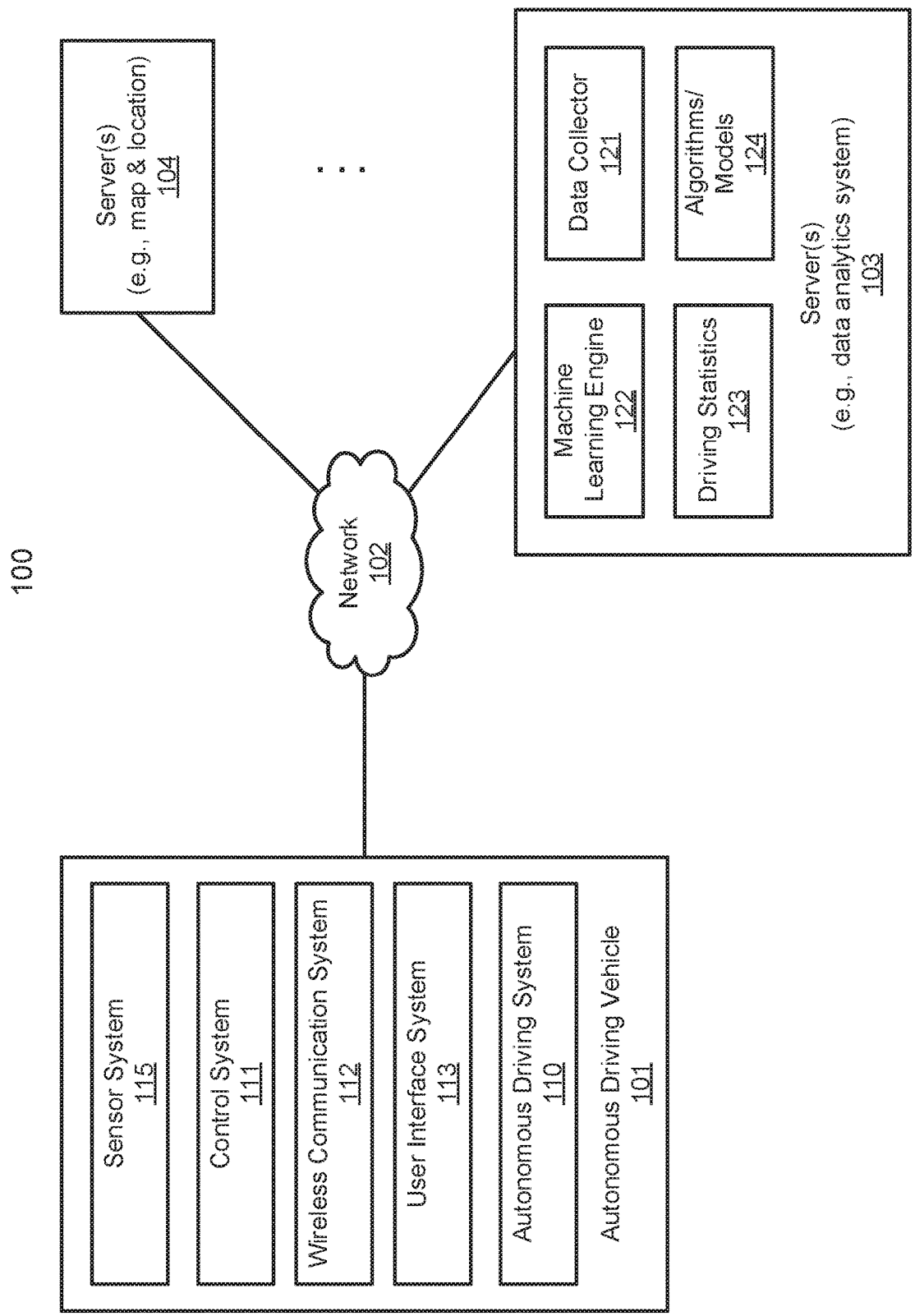
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method, apparatus, and system for determining whether to automatically switch on an emergency light at an autonomous driving vehicle (ADV) is disclosed. A current speed of an autonomous driving vehicle (ADV) at a first time instant is determined. A current deceleration of the ADV at the first time instant is determined. Whether the current speed satisfies a current speed condition at the first time instant and whether the current deceleration satisfies a current deceleration condition at the first time instant are determined. In response to determining that the current speed satisfies the current speed condition and that the current deceleration satisfies the current deceleration condition, whether a recent deceleration history of the ADV satisfies a recent deceleration history condition and whether an expected deceleration of the ADV satisfies an expected deceleration condition are determined in relation to the first time instant. In response to determining, in relation to the first time instant, that either the recent deceleration history satisfies the recent deceleration history condition or the expected deceleration satisfies the expected deceleration condition, an emergency light of the ADV is automatically switched on.

In one embodiment, the current speed satisfies the current speed condition when the current speed is above a first speed threshold. In one embodiment, the current deceleration satisfies the current deceleration condition when the current deceleration is above a first deceleration threshold.

In one embodiment, the recent deceleration history satisfies the recent deceleration history condition when, since the first time instant, the ADV has slowed down by a first speed difference that is above a first speed difference threshold with a first average deceleration that is above a first average deceleration threshold, or has slowed down by a second speed difference that is above a second speed difference threshold with a second average deceleration that is above a second average deceleration threshold. In particular, the first speed difference threshold is higher than the second speed difference threshold, and the first average deceleration threshold is lower than the second average deceleration threshold.

In one embodiment, to determine whether the expected deceleration satisfies the expected deceleration condition, a time to collision is determined based on the current speed of the ADV, a current speed of a leading vehicle directly in front of the ADV, and a distance between the leading vehicle and the ADV. Whether the time to collision is below a time-to-collision threshold is determined. In response to determining that the time to collision is not below the time-to-collision threshold, the expected deceleration is determined as not satisfying the expected deceleration condition.

On the other hand, if the time to collision is below the time-to-collision threshold, the expected deceleration is determined based on the current speed of the ADV, the current speed of the leading vehicle, and the distance between the leading vehicle and the ADV. Whether the expected deceleration is above a second deceleration threshold is determined. In response to determining that the expected deceleration is above the second deceleration threshold, the expected deceleration is determined as satisfying the expected deceleration condition. On the other hand, in response to determining that the expected deceleration is not above the second deceleration threshold, the expected deceleration is determined as not satisfying the expected deceleration condition.

In one embodiment, subsequent to switching on the emergency light, the emergency light is kept on until it is switched off in response to a user operation. In one embodiment, the emergency light exhibits a flashing pattern when switched on.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
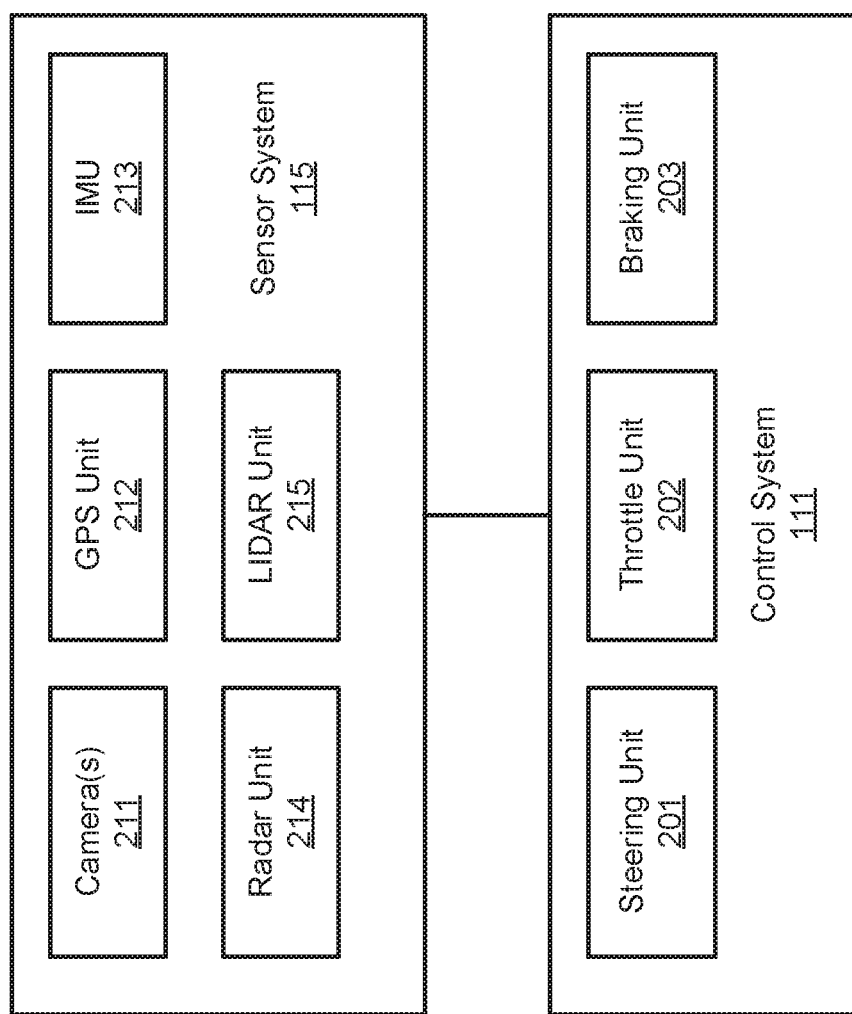
FIG. 2 is a block diagram illustrating an example of an autonomous driving vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm for automatically switching on an emergency light at an ADV. Algorithms 124 can then be uploaded on ADVs to be utilized during autonomous driving in real-time.

Figure 3A:
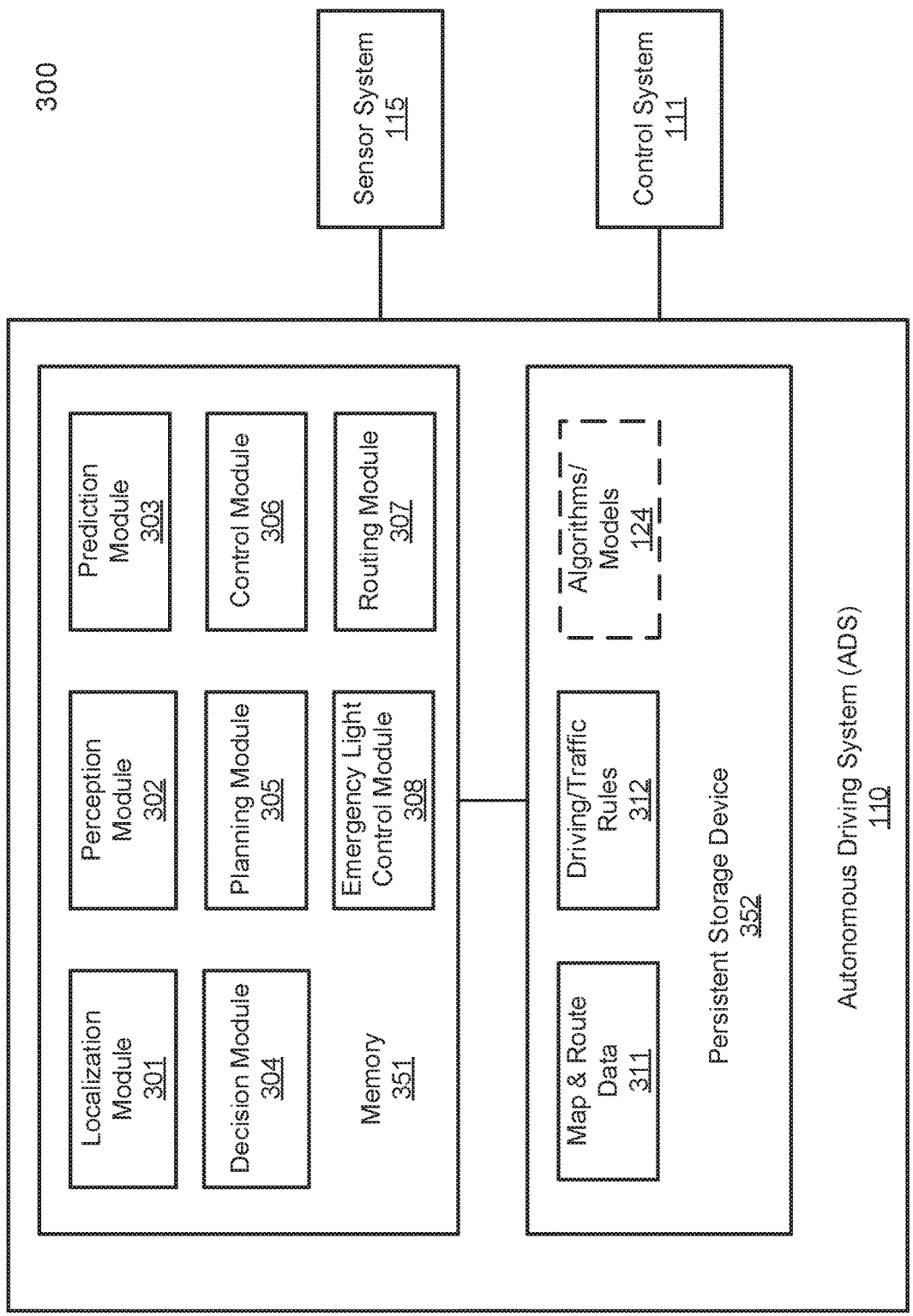
FIGS. 3A-3B are block diagrams illustrating an example of an autonomous driving system used with an autonomous driving vehicle according to one embodiment.
Figure 3B:
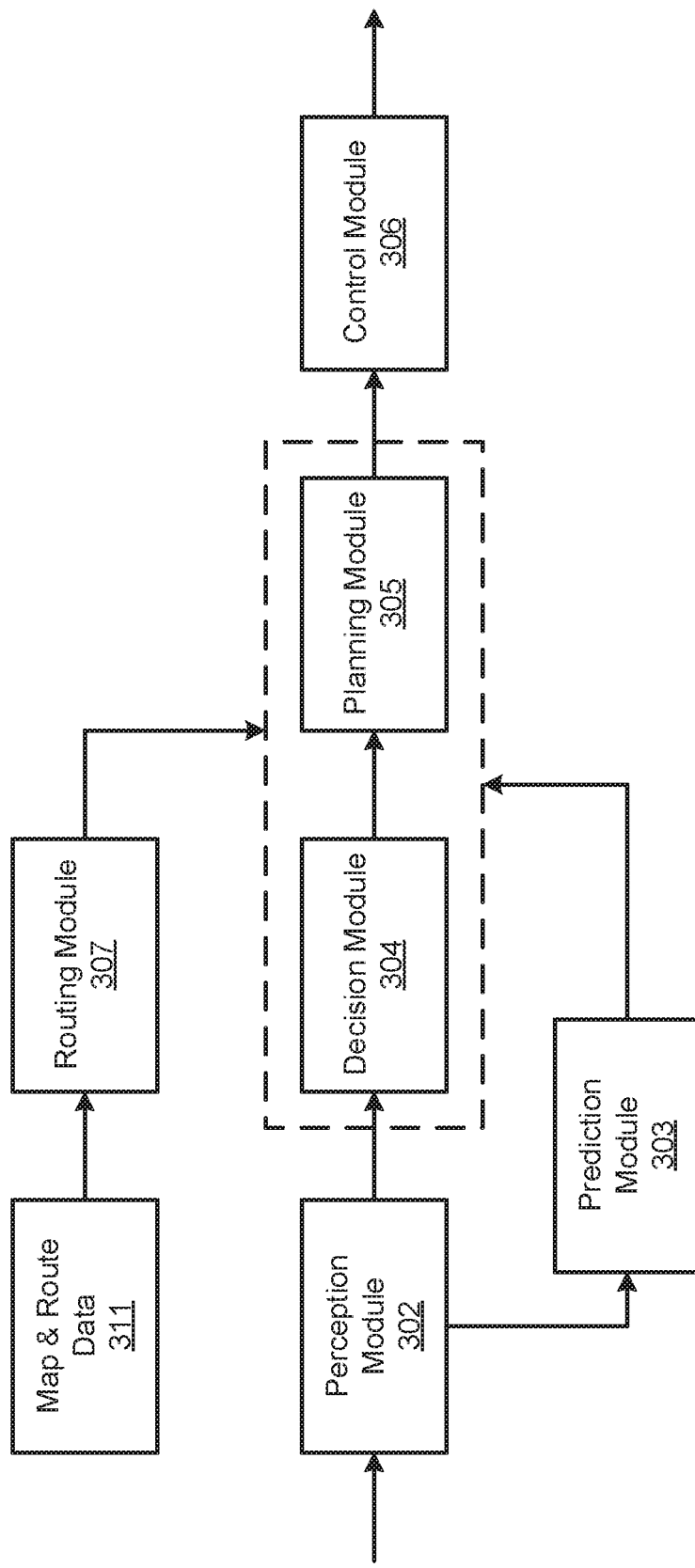

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, emergency light control module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
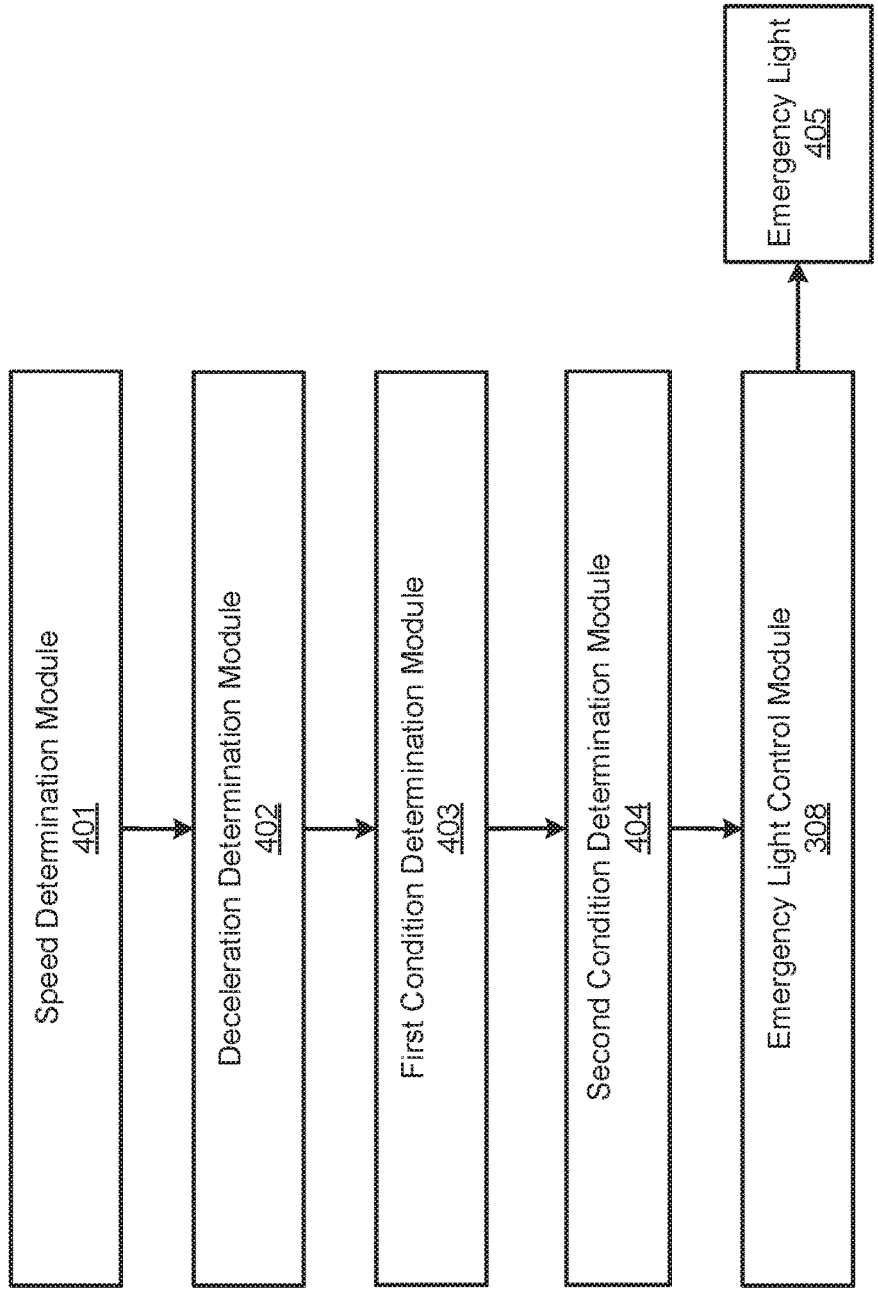
FIG. 4 is a block diagram illustrating various example modules usable for determining whether to automatically switch on an emergency light at an autonomous driving vehicle (ADV) according to one embodiment.

Referring to FIG. 4, a block diagram 400 illustrating various example modules usable for determining whether to automatically switch on an emergency light at an autonomous driving vehicle (ADV) according to one embodiment is shown. The various modules illustrated in FIG. 4 may be implemented in hardware, software, or a combination thereof. At speed determination module 401, a current speed of an autonomous driving vehicle (ADV) at a first time instant is determined. At deceleration determination module 402, a current deceleration of the ADV at the first time instant is determined.

At first condition determination module 403, whether the current speed satisfies a current speed condition at the first time instant and whether the current deceleration satisfies a current deceleration condition at the first time instant are determined. At second condition determination module 404, in response to determining that the current speed satisfies the current speed condition and that the current deceleration satisfies the current deceleration condition, whether a recent deceleration history of the ADV satisfies a recent deceleration history condition and whether an expected deceleration of the ADV satisfies an expected deceleration condition are determined in relation to the first time instant. At emergency light control module 308, in response to determining, in relation to the first time instant, that either the recent deceleration history satisfies the recent deceleration history condition or the expected deceleration satisfies the expected deceleration condition, an emergency light 405 of the ADV is automatically switched on.

In one embodiment, the current speed satisfies the current speed condition when the current speed is above a first speed threshold (e.g., 10 m/s). In one embodiment, the current deceleration satisfies the current deceleration condition when the current deceleration is above a first deceleration threshold (e.g., 2 m/s$^2$).

In one embodiment, the recent deceleration history satisfies the recent deceleration history condition when, since the first time instant, the ADV has slowed down by a first speed difference that is above a first speed difference threshold (e.g., 15 m/s) with a first average deceleration that is above a first average deceleration threshold (e.g., 2 m/s$^2$), or has slowed down by a second speed difference that is above a second speed difference threshold (e.g., 10 m/s) with a second average deceleration that is above a second average deceleration threshold (e.g., 3 m/s²). In particular, the first speed difference threshold (e.g., 15 m/s) is higher than the second speed difference threshold (e.g., 10 m/s), and the first average deceleration threshold (e.g., 2 m/s²) is lower than the second average deceleration threshold (e.g., 3 m/s²).

In one embodiment, to determine whether the expected deceleration satisfies the expected deceleration condition, a time to collision is determined based on the current speed of the ADV, a current speed of a leading vehicle directly in front of the ADV, and a distance between the leading vehicle and the ADV. In particular, in one embodiment, the time to collision may be determined based on the following formula: time to collision=distance between leading vehicle and ADV/(current speed of ADV−current speed of leading vehicle). Whether the time to collision is below a time-to-collision threshold (e.g., 8 s) is determined. In response to determining that the time to collision is not below the time-to-collision threshold (e.g., 8 s), the expected deceleration is determined as not satisfying the expected deceleration condition.

On the other hand, if the time to collision is below the time-to-collision threshold (e.g., 8 s), the expected deceleration is determined based on the current speed of the ADV, the current speed of the leading vehicle, and the distance between the leading vehicle and the ADV. In particular, in one embodiment, the expected deceleration may be determined based on the following formula: expected deceleration=(current speed of ADV−current speed of leading vehicle)^2/(2*distance between leading vehicle and ADV). Whether the expected deceleration is above a second deceleration threshold (e.g., 2 m/s²) is determined. In response to determining that the expected deceleration is above the second deceleration threshold (e.g., 2 m/s²), the expected deceleration is determined as satisfying the expected deceleration condition. On the other hand, in response to determining that the expected deceleration is not above the second deceleration threshold (e.g., 2 m/s²), the expected deceleration is determined as not satisfying the expected deceleration condition.

In one embodiment, subsequent to switching on the emergency light, the emergency light is kept on until it is switched off in response to a user operation. In one embodiment, the emergency light exhibits a flashing pattern when switched on.

It should be appreciated that the various values for the parameters and thresholds provided herein are examples, and are for illustrative purposes only. In different embodiments, the values may be changed or adapted without deviating from the scope of the disclosure.

It should be further appreciated that herein that a deceleration value is equivalent to an acceleration value that is its additive inverse. For example, a deceleration of 2 m/s² is equivalent to an acceleration of −2 m/s². Further, a deceleration that is above a deceleration threshold is equivalent to an acceleration that is below a corresponding acceleration threshold, and vice versa. For example, a deceleration that is above a deceleration threshold of 2 m/s² is equivalent to an acceleration that is below an acceleration threshold of −2 m/s'. The representation chosen does not change the substance of the material that is described.

Figure 5:
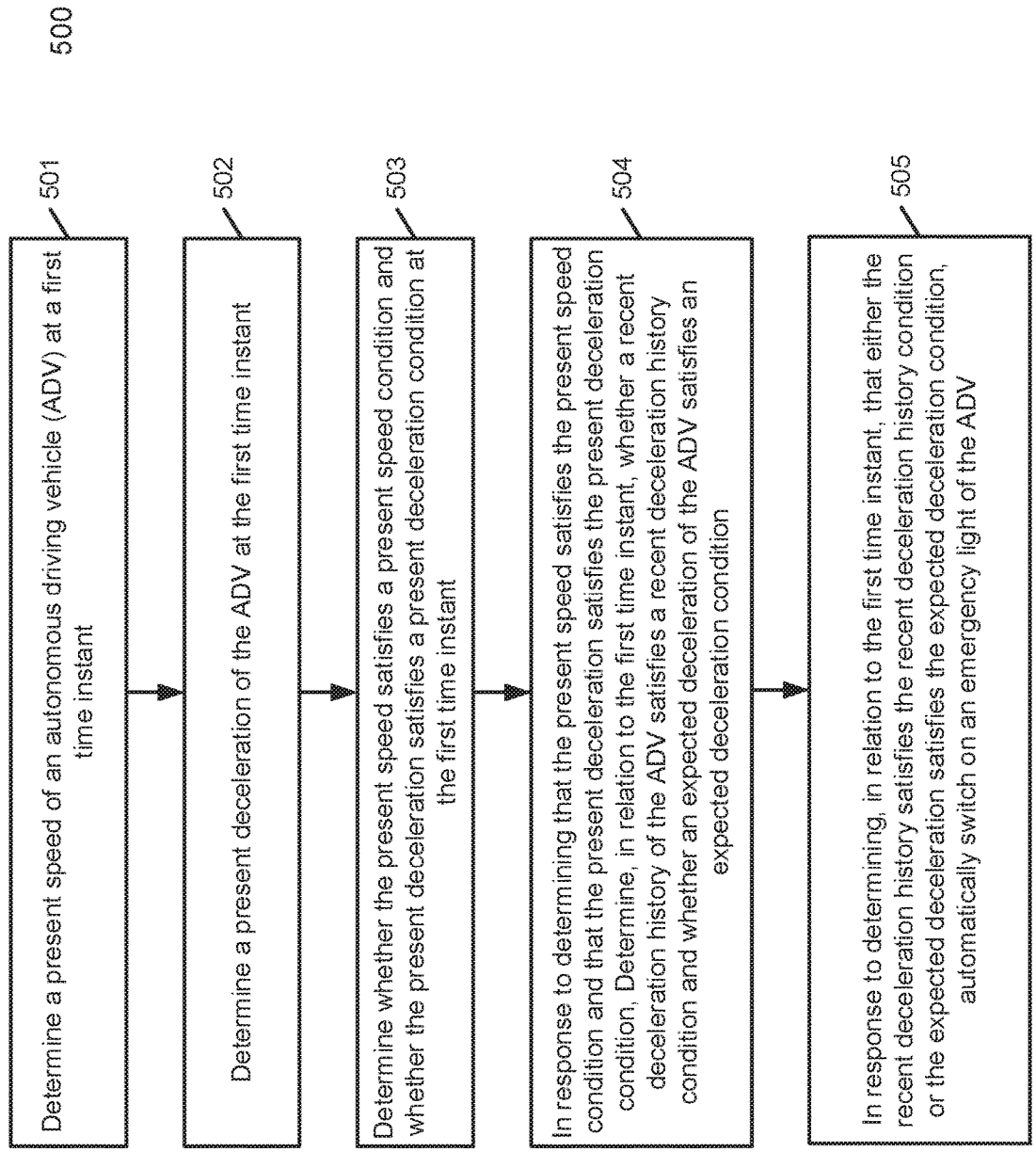
FIG. 5 is a flowchart illustrating an example method for determining whether to automatically switch on an emergency light at an autonomous driving vehicle (ADV) according to one embodiment.

Referring to FIG. 5, a flowchart illustrating an example method 500 for determining whether to automatically switch on an emergency light at an autonomous driving vehicle (ADV) according to one embodiment is shown. The process 500 may be implemented in hardware, software, or a combination thereof. At block 501, a current speed of an autonomous driving vehicle (ADV) at a first time instant is determined. At block 502, a current deceleration of the ADV at the first time instant is determined. At block 503, whether the current speed satisfies a current speed condition at the first time instant and whether the current deceleration satisfies a current deceleration condition at the first time instant are determined. At block 504, in response to determining that the current speed satisfies the current speed condition and that the current deceleration satisfies the current deceleration condition, whether a recent deceleration history of the ADV satisfies a recent deceleration history condition and whether an expected deceleration of the ADV satisfies an expected deceleration condition are determined in relation to the first time instant. At block 505, in response to determining, in relation to the first time instant, that either the recent deceleration history satisfies the recent deceleration history condition or the expected deceleration satisfies the expected deceleration condition, an emergency light of the ADV is automatically switched on.

Therefore, embodiments of the disclosure relate to a method for automatically switching on an emergency light of an ADV when a harsh brake is applied. Some embodiments may be used with ADVs at L3 or above. Accordingly, the following vehicles may be promptly warned without needing the driver's manual intervention.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   determining whether a current speed of an autonomous driving vehicle (ADV) satisfies a current speed condition and whether a current deceleration of the ADV satisfies a current deceleration condition at a first time instant;
   in response to determining that the current speed satisfies the current speed condition and that the current deceleration satisfies the current deceleration condition, determining, in relation to the first time instant, whether a recent deceleration history of the ADV satisfies a recent deceleration history condition and whether an expected deceleration of the ADV satisfies an expected deceleration condition; and
   in response to determining, in relation to the first time instant, that either the recent deceleration history satisfies the recent deceleration history condition or the expected deceleration satisfies the expected deceleration condition, automatically switching on an emergency light of the ADV.

2. The method of claim 1, wherein the current speed satisfies the current speed condition when the current speed is above a first speed threshold.

3. The method of claim 1, wherein the current deceleration satisfies the current deceleration condition when the current deceleration is above a first deceleration threshold.

4. The method of claim 1, wherein the recent deceleration history satisfies the recent deceleration history condition when, since the first time instant, the ADV has slowed down by a first speed difference that is above a first speed difference threshold with a first average deceleration that is above a first average deceleration threshold, or has slowed down by a second speed difference that is above a second speed difference threshold with a second average deceleration that is above a second average deceleration threshold, wherein the first speed difference threshold is higher than the second speed difference threshold, and the first average deceleration threshold is lower than the second average deceleration threshold.

5. The method of claim 1, wherein determining whether the expected deceleration satisfies the expected deceleration condition further comprises:
   determining a time to collision based on the current speed of the ADV, a current speed of a leading vehicle directly in front of the ADV, and a distance between the leading vehicle and the ADV;
   determining whether the time to collision is below a time-to-collision threshold; and
   in response to determining that the time to collision is not below the time-to-collision threshold, determining that the expected deceleration does not satisfy the expected deceleration condition.

6. The method of claim 5, further comprising, in response to determining that the time to collision is below the time-to-collision threshold:
   determining the expected deceleration based on the current speed of the ADV, the current speed of the leading vehicle, and the distance between the leading vehicle and the ADV;
   determining whether the expected deceleration is above a second deceleration threshold;
   in response to determining that the expected deceleration is above the second deceleration threshold, determining that the expected deceleration satisfies the expected deceleration condition; and
   in response to determining that the expected deceleration is not above the second deceleration threshold, determining that the expected deceleration does not satisfy the expected deceleration condition.

7. The method of claim 1, wherein subsequent to switching on the emergency light, the emergency light is kept on until it is switched off in response to a user operation.

8. The method of claim 1, wherein the emergency light exhibits a flashing pattern when switched on.

9. A non-transitory machine-readable medium having instructions stored therein, which when executed by a processor, cause the processor to perform operations, the operations comprising:
   determining whether a current speed of an autonomous driving vehicle (ADV) satisfies a current speed condition and whether a current deceleration of the ADV satisfies a current deceleration condition at a first time instant;
   in response to determining that the current speed satisfies the current speed condition and that the current deceleration satisfies the current deceleration condition, determining, in relation to the first time instant, whether a recent deceleration history of the ADV satisfies a recent deceleration history condition and whether an expected deceleration of the ADV satisfies an expected deceleration condition; and
   in response to determining, in relation to the first time instant, that either the recent deceleration history satisfies the recent deceleration history condition or the expected deceleration satisfies the expected deceleration condition, automatically switching on an emergency light of the ADV.

10. The machine-readable medium of claim 9, wherein the current speed satisfies the current speed condition when the current speed is above a first speed threshold.

11. The machine-readable medium of claim 9, wherein the current deceleration satisfies the current deceleration condition when the current deceleration is above a first deceleration threshold.

12. The machine-readable medium of claim 9, wherein the recent deceleration history satisfies the recent deceleration history condition when, since the first time instant, the ADV has slowed down by a first speed difference that is above a first speed difference threshold with a first average deceleration that is above a first average deceleration threshold, or has slowed down by a second speed difference that is above a second speed difference threshold with a second average deceleration that is above a second average deceleration threshold, wherein the first speed difference threshold is higher than the second speed difference threshold, and the first average deceleration threshold is lower than the second average deceleration threshold.

13. The machine-readable medium of claim 9, wherein determining whether the expected deceleration satisfies the expected deceleration condition further comprises:
   determining a time to collision based on the current speed of the ADV, a current speed of a leading vehicle directly in front of the ADV, and a distance between the leading vehicle and the ADV;
   determining whether the time to collision is below a time-to-collision threshold; and
   in response to determining that the time to collision is not below the time-to-collision threshold, determining that the expected deceleration does not satisfy the expected deceleration condition.

14. The machine-readable medium of claim 13, wherein the operations further comprise, in response to determining that the time to collision is below the time-to-collision threshold:
   determining the expected deceleration based on the current speed of the ADV, the current speed of the leading vehicle, and the distance between the leading vehicle and the ADV;
   determining whether the expected deceleration is above a second deceleration threshold;
   in response to determining that the expected deceleration is above the second deceleration threshold, determining that the expected deceleration satisfies the expected deceleration condition; and
   in response to determining that the expected deceleration is not above the second deceleration threshold, determining that the expected deceleration does not satisfy the expected deceleration condition.

15. The machine-readable medium of claim 9, wherein subsequent to switching on the emergency light, the emergency light is kept on until it is switched off in response to a user operation.

16. The machine-readable medium of claim 9, wherein the emergency light exhibits a flashing pattern when switched on.

17. A data processing system, comprising:
   a processor; and
   a memory coupled to the processor to store instructions, which when executed by the processor, cause the processor to perform operations, the operations including
      determining whether a current speed of an autonomous driving vehicle (ADV) satisfies a current speed condition and whether a current deceleration of the ADV satisfies a current deceleration condition at a first time instant;
      in response to determining that the current speed satisfies the current speed condition and that the current deceleration satisfies the current deceleration condition, determining, in relation to the first time instant, whether a recent deceleration history of the ADV satisfies a recent deceleration history condition and whether an expected deceleration of the ADV satisfies an expected deceleration condition; and
      in response to determining, in relation to the first time instant, that either the recent deceleration history satisfies the recent deceleration history condition or the expected deceleration satisfies the expected deceleration condition, automatically switching on an emergency light of the ADV.

18. The system of claim 17, wherein the current speed satisfies the current speed condition when the current speed is above a first speed threshold.

19. The system of claim 17, wherein the current deceleration satisfies the current deceleration condition when the current deceleration is above a first deceleration threshold.

20. The system of claim 17, wherein the recent deceleration history satisfies the recent deceleration history condition when, since the first time instant, the ADV has slowed down by a first speed difference that is above a first speed difference threshold with a first average deceleration that is above a first average deceleration threshold, or has slowed down by a second speed difference that is above a second speed difference threshold with a second average deceleration that is above a second average deceleration threshold, wherein the first speed difference threshold is higher than the second speed difference threshold, and the first average deceleration threshold is lower than the second average deceleration threshold.

* * * * *